(12) United States Patent
Moreau et al.

(10) Patent No.: US 6,497,149 B1
(45) Date of Patent: Dec. 24, 2002

(54) MOBILE PLATE ACCELEROMETER WITH ELECTROSTATIC FEEDBACK MOTOR

(75) Inventors: Maurice Moreau, Landemont (FR); Jean-Paul Menard, Thouare sur Loire (FR)

(73) Assignee: Sercel (FR)

( * ) Notice: Subject to any disclaimer, the term of this patent is extended or adjusted under 35 U.S.C. 154(b) by 0 days.

(21) Appl. No.: 09/529,318

(22) PCT Filed: Oct. 7, 1998

(86) PCT No.: PCT/FR98/02139

§ 371 (c)(1),
(2), (4) Date: Apr. 10, 2000

(87) PCT Pub. No.: WO99/18443

PCT Pub. Date: Apr. 15, 1999

(30) Foreign Application Priority Data

Oct. 8, 1997 (FR) .............................................. 97 12545

(51) Int. Cl.⁷ .............................................. G01P 15/125
(52) U.S. Cl. .................................................... 73/514.32
(58) Field of Search ........................ 73/514.17, 514.18, 73/514.32

(56) References Cited

U.S. PATENT DOCUMENTS 4,922,756 A     5/1990  Henrion
5,211,051 A     5/1993  Kaiser et al.
5,345,824 A     9/1994  Sherman et al.
5,610,335 A     3/1997  Shaw et al.

FOREIGN PATENT DOCUMENTS

EP      565 462     10/1993
FR      2724463     3/1996

OTHER PUBLICATIONS

Lemkin M. et al.: "A Micromachined fully differential lateral accelerometer" Proceedings of hte iEEE 1996 Custom . . ., San Diego, May 5–8, 1996 p. 316.

*Primary Examiner*—Richard A. Moller
(74) *Attorney, Agent, or Firm*—Blakely Sokoloff Taylor & Zafman, LLP

(57) ABSTRACT

A slave mobile plate accelerometer using variations of capacitance to detect the movement of a mass. The apparatus comprises at least one pair of fixed electrodes rigidly attached to an armature, and at least one mobile electrode suspended by springs from the armature, between the two fixed electrodes of each pair of fixed electrodes, to form two capacitors, each mobile electrode being adapted to move between the fixed electrodes of each pair of fixed electrodes, due to the effect of acceleration, so causing a variation of the capacitance of each capacitor. The accelerometer further includes an electronic circuit for adjusting the electrostatic stiffness of at least one combination of a fixed electrode and a mobile electrode and a control system for detecting the variation of the capacitance of each capacitor.

17 Claims, 2 Drawing Sheets

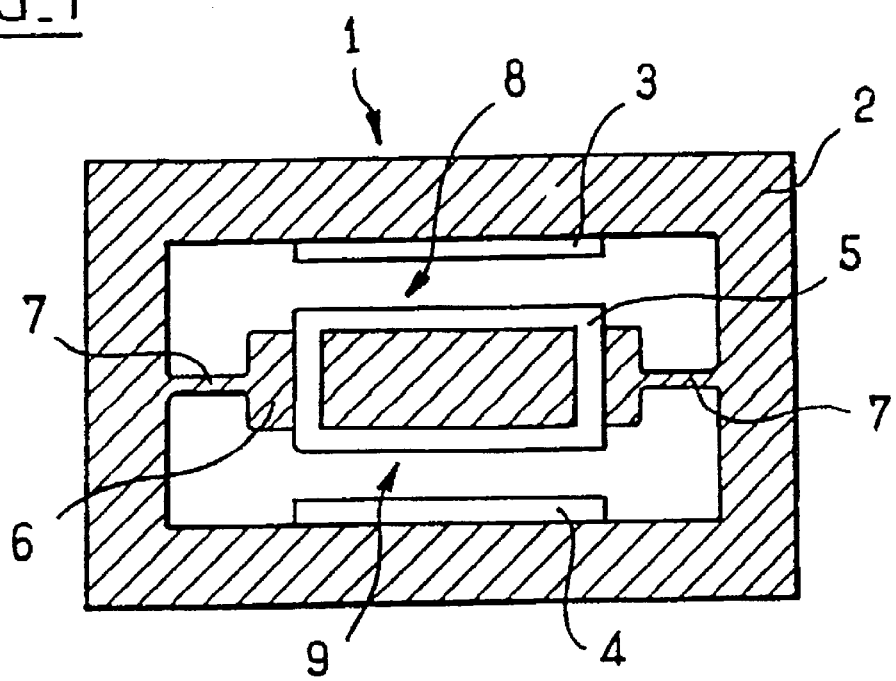
FIG_1
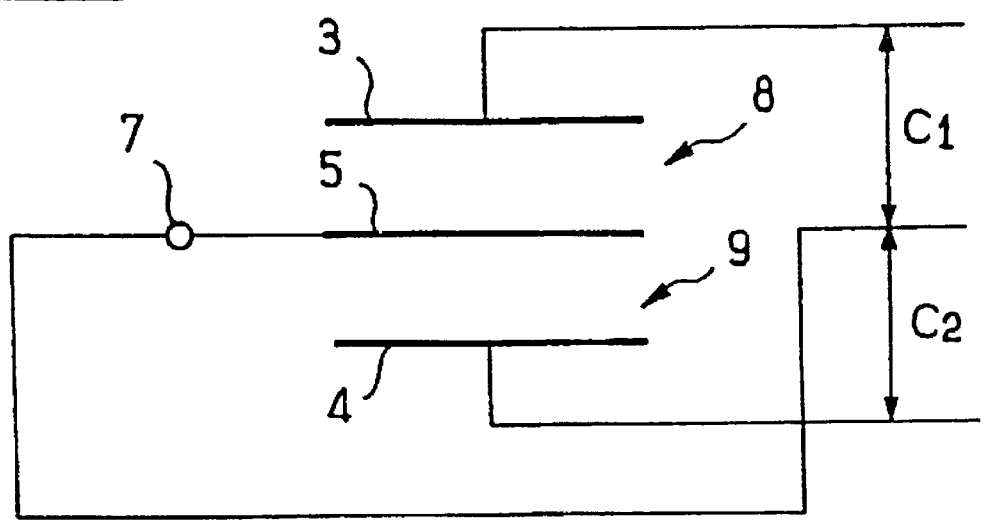
FIG_2

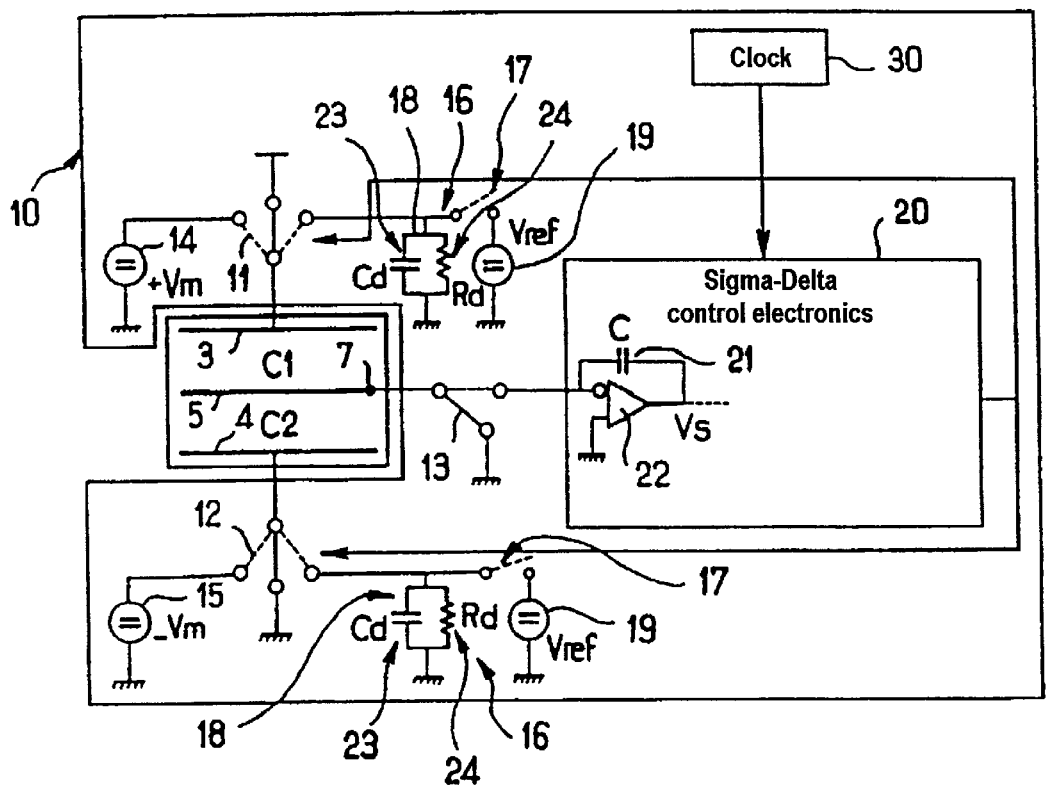
FIG_3
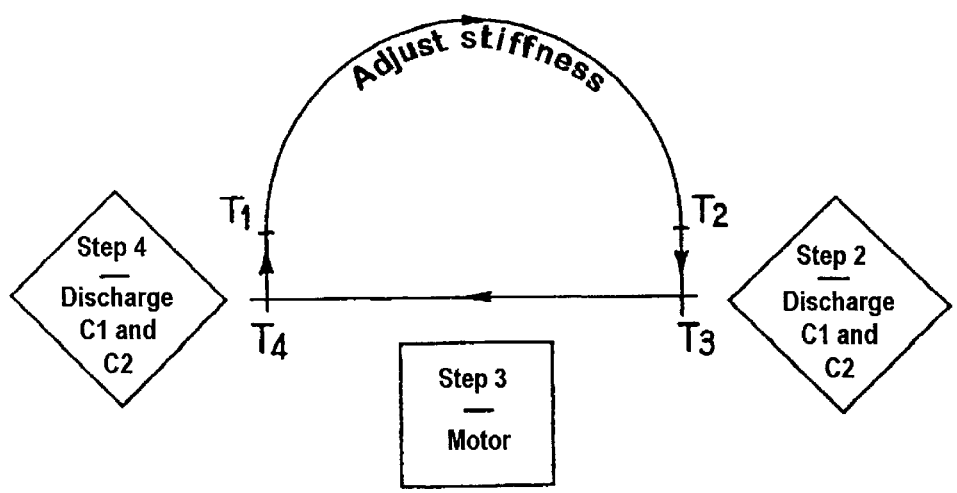
FIG_4

MOBILE PLATE ACCELEROMETER WITH ELECTROSTATIC FEEDBACK MOTOR

The invention relates to the field of acceleration sensors. The invention is more particularly a slaved mobile plate accelerometer using capacitance variations to detect the movement of a mass.

Micromachined accelerometers are now well known in the sensor industry. They generally comprise a mobile plate, referred to as the seismic plate, suspended from a fixed armature by springs; the mobile plate/armature/spring assembly is obtained by chemically etching a silicon wafer.

The mobile plate comprises an electrode, for example. The fixed armature comprises two electrodes. The mobile electrode forms a capacitor with each of the two fixed electrodes. If acceleration is applied to the sensor, the mobile plate moves relative to the fixed armature, so creating an imbalance of the capacitances. A control circuit detects the difference between the two capacitances and reacts by applying a feedback voltage, and therefore an electrostatic force, between the mobile plate electrode and the fixed armature electrodes, in order to return the mobile plate to its original position. This provides an electrostatic feedback motor.

The electrostatic stiffness is known to be a function of the electrostatic force. For a sensor of the above kind, the principle of adjusting the electrostatic stiffness is as follows.

In the absence of electric field, a force $F_m$ tends to return the mobile electrode to its rest position by virtue of the stiffness $k_m$ of the springs ($k_m$ is the derivative of the return force with respect to the displacement). However, in the presence of an electric field (voltage between the fixed electrodes and the mobile electrode), an electrostatic force $F_e$ attracts the mobile electrode towards one or other of the fixed electrodes. This force is the sum of two forces in opposite directions proportional to the square of the electric field between the electrodes:

$F_e = \epsilon_0 \cdot (S_1 \cdot E_1^2 - S_2 \cdot E_2^2)$, where $S_i$ is the surface area of the capacitor formed by the fixed electrode i and the mobile electrode, $E = V_i/d_i$, $V_i$ is the voltage between the fixed plate electrode i and the electrode of the facing mobile plate, and $d_i$ is the distance between the electrode i and the mobile plate electrode (i=1 or 2).

The electrostatic force is a function of the distance between the electrodes, and therefore of the displacement, like the spring return force, but in the opposite direction. Its derivative with respect to the displacement is the electrostatic stiffness $k_e$.

It is also known that the frequency $f_{rm}$ of mechanical resonance is related to the mass m of the mobile plate and to the stiffness $k_m$ of the springs:

$$f_{rm} = \frac{1}{2\pi} \sqrt{\frac{k_m}{m}}$$

The mass of the mobile plate is generally known accurately and closely controlled in manufacture, but this is not the case with the stiffness $k_m$ of the springs. Performance therefore varies greatly from one manufacturing batch to another. This makes it necessary to solve a difficult problem in the manufacture of such accelerometers, namely that of obtaining a precise and reproducible frequency of mechanical resonance of the mobile plate/spring cell. The dynamic range (maximum signal-to-noise ratio) of this type of sensor is highly dependent on this frequency.

There is also another problem to be solved for accelerometers sensitive to the vertical component: sagging of the mobile mass due to the effect of gravity.

In vertical accelerometers (i.e. ones sensitive to the vertical component of acceleration), the mass sags due to its own weight by an amount $\Delta z = m \cdot g/k_m$ (m=mass of mobile plate, g=acceleration due to gravity, $k_m$=mechanical stiffness of springs).

Moreover, as the dynamic range of the accelerometer is proportional to the mass divided by the stiffness (S=m/k), a high mass and a low stiffness are required to achieve good performance. This leads to a large sag due to gravity.

In the vertical position, for a system with free deformation, the distance between the fixed plates and the mobile plates must be at least equal to the sag, as otherwise return systems must be used. However, too great a distance between the electrodes leads to poor performance because of problems with obtaining sufficient electric fields. The sagging therefore limits the performance of the sensor.

The mobile mass is generally centred on the armature in an attempt to solve these problems, which imposes the use of relatively complex manufacturing techniques such as:

1. prestressing the springs,
2. additional compensator springs,
3. electrostatic return (see U.S. Pat. No. 5,345,824),
4. remote electromagnetic return, and
5. additional fabrication steps (see U.S. Pat. No. 4,922,756).

U.S. Pat. No. 4,922,756 describes the fabrication of a micromachined sensor with the stiffness constants of the springs precisely controlled during the fabrication process. However, this is achieved at the price of additional fabrication technology steps.

U.S. Pat. No. 5,345,824 addresses the problem of the spread of the stiffness constant of the springs by minimizing the mechanical stiffness constant $k_m$ but centring the mass by means of a small percentage of the total available electrostatic force. The output signal is therefore independent of the constant $k_m$ because the springs are not deflected. However, this modifies the sensitivity of the accelerometer.

The skilled person therefore usually seeks a compromise between optimizing performance by reducing the stiffness constant, which increases the sag, optimizing performance by reducing the distance between the electrodes to obtain sufficiently high electric fields, which limits the possibilities of sagging, and optimizing the usable range of frequencies.

The device according to the invention is a slaved mobile plate accelerometer using variations of capacitance to detect the movement of a mass, it comprises:

at least one fixed electrode rigidly attached to an armature, at least one mobile electrode suspended by springs from the armature and facing each fixed electrode to form at least one capacitor, each mobile electrode being adapted to move relative to each fixed electrode due to the effect of acceleration, so causing a variation of the capacitance of each capacitor, and an electronic circuit for adjusting the electrostatic stiffness and comprising a control system for detecting the variation of the capacitance of each capacitor and reacting by applying a feedback voltage between each mobile electrode and the fixed electrode facing said mobile electrode, characterized in that the springs have a stiffness chosen intentionally to place the mechanical resonant frequency beyond the top frequency of the band of interest and the circuit for adjusting the electrostatic stiffness is adapted to return the apparent resonant frequency into the band of interest.

A stiffness-adjusting device according to the invention of the above kind improves the performance of the system since it simultaneously:

1. compensates the spread of the mechanical stiffness of the springs suspending the mobile plate,
2. limits the sagging of vertical accelerometers by using a high mechanical stiffness, compensated by a high electrostatic stiffness, and
3. optimizes performance in the wanted band.

Note that deliberately placing the frequency of mechanical resonance beyond the top frequency of the wanted band overcomes the prejudices of the skilled person, this solution being at first sight unfavourable to the dynamic range, which is proportional to $S=m/k_m$.

In an advantageous embodiment of the accelerometer according to the invention, the accelerometer includes two fixed electrodes electrically insulated from each other.

In another advantageous embodiment of the accelerometer according to the invention the accelerometer includes a single mobile electrode.

In another advantageous embodiment, the electronic circuit of the accelerometer according to the invention enables time-division multiplexing of each mobile electrode.

In a further advantageous embodiment, the accelerometer according to the invention has a time-division multiplexing cycle which includes four steps:

a first step during which a voltage sample and its symmetrical counterpart relative to ground are respectively applied between each fixed electrode and the mobile electrode, a second step during which the capacitor constituted by one of said two fixed electrodes and the mobile electrode and the capacitor constituted by the other fixed electrode and the mobile electrode are discharged, a third step during which a feedback voltage is applied to one or the other of the capacitors constituted by the mobile electrode and one of the fixed electrodes, as a function of a decision taken by the control system, and a fourth step during which the operation of the second step is repeated.

In another advantageous embodiment, the electronic circuit of the accelerometer according to the invention varies the amplitudes of the voltages between each fixed electrode and each mobile electrode to adjust the electrostatic stiffness.

A further advantageous embodiment of the electronic circuit of the accelerometer according to the invention enables the duration of the time-division multiplexing steps to be adjusted.

In a further advantageous embodiment of the accelerometer according to the invention, the duration of the time-division multiplexing steps is adjusted to adjust the electrostatic stiffness.

In a further advantageous embodiment of the accelerometer according to the invention, the electrostatic stiffness is adjusted to compensate the spread of the mechanical stiffness of the springs.

In another advantageous embodiment of the accelerometer according to the invention, the electrostatic stiffness is adjusted to reduce sagging when the accelerometer is in a vertical position, without loss of performance.

In another embodiment of the accelerometer according to the invention, the electrostatic stiffness is adjusted to optimize performance as a function of the wanted band.

The accelerometer according to the invention can also be a component of another, more complex device.

The following description of one particular embodiment of the invention is purely illustrative and is not limiting on the invention. It must be read with reference to the accompanying drawings:

FIG. 1 is a diagram showing a particular non-limiting embodiment of a sensor of an accelerometer according to the invention.

FIG. 2 is a diagrammatic representation of a capacitive device of the sensor.

FIG. 3 is a block diagram of one particular but non-limiting embodiment of an accelerometer according to the invention.

FIG. 4 is a schematic representation of one example of a mobile electrode multiplexing period.

The invention, which can be constructed and operate in accordance with the following non-limiting specific embodiment, comprises a sensor 1 and an electronic circuit 10.

The sensor 1 comprises the following components:

an armature 2, two fixed electrodes 3 and 4 rigidly attached to the armature 2, a mobile electrode 5 supported by a mobile plate 6, and springs 7 elastically connecting the mobile plate 6 to the armature 2.

The mobile plate 6 which supports the mobile electrode 5, the armature 2 to which the fixed electrodes 3 and 4 are connected and the springs 7 are micromachined in a semi-conductor substrate by the usual microfabrication technology processes of microelectronics: chemical etching, ion erosion, photolithography or electrolithography, ion implantation, etc. The semiconductor can be silicon, for example.

The mobile electrode 5 is formed by a single conductive area or a plurality of conductive areas which are electrically interconnected.

Each of the fixed electrodes 3 and 4 is formed by a single conductive area or a plurality of conductive areas which are electrically interconnected. The fixed electrodes 3 and 4 as described are therefore electrically insulated from each other.

The mobile electrode 5 is electrically insulated from the fixed electrodes 3 and 4.

The mobile electrode 5 forms a capacitor with each of the fixed electrodes 3 and 4. The sensor 1 therefore comprises two capacitors 8 and 9 having the mobile electrode 5 as a common electrode.

The mobile electrode 5 must move between the two fixed electrodes 3 and 4 due to the effect of a force. Accordingly, if an acceleration is applied to the sensor 1, the displacement of the mobile electrode 5 simultaneously varies the capacitances of the capacitors 8 and 9.

In an advantageous but non-limiting embodiment of the invention, the electronic circuit 10 is of the "switched capacitor" type. It also comprises voltage generators 14, 15 and 19, a capacitor 21, an amplifier 22 and a control system 20. It is timed by a clock 30.

Four switches 11, 12, 13 and 17 selectively switch certain components of the electronic circuit 10 into and out of circuit during certain phases of the cycle of the clock 30.

The switch 11 selectively connects the fixed electrode 3 to ground, to $+V_m$ 14 or to a circuit 16 generating a feedback voltage $V_{cr}$. The switch 12 connects the fixed electrode 4 selectively to ground, to $-V_m$ 15 or to the circuit 16 generating the feedback voltage $V_{cr}$. The switch 13 selectively connects the mobile electrode 5 to the input of the control system 20 or to ground. The switch 19 connects the generator 19 of the voltage $V_{ref}$ into circuit.

The switches 11, 12 and 13 are also used to ground the electrodes 3, 4 and 5 to discharge the capacitors 8 and 9, respectively. The capacitor 21 is also discharged by a switch (not shown).

A parallel RC circuit 18 is advantageously incorporated into the circuit 16 generating the feedback voltage $V_{cr}$. The parallel RC circuit 18 comprises a discharge capacitor $C_d$ 23 and a discharge resistor $R_d$ 24.

The parallel RC circuit 18 shunts the generator 19 of the voltage $V_{ref}$. The switch 17 connects the parallel RC circuit 18 to the generator 19 of the voltage $V_{ref}$.

As explained below, the control system 20 detects the variation of the capacitance of the capacitors 8 and 9 by applying voltages $+V_m$ and $-V_m$ between the mobile electrode 5 and the fixed electrodes 3 and 4 and by applying a feedback voltage $+V_{cr}$ between the mobile electrode 5 and one of the fixed electrodes 3 or 4, the mobile electrode/fixed electrodes assembly then constituting an electrostatic feedback motor which returns the mobile electrode 5 to its initial position. The control system 20 can include a Sigma-Delta modulator.

The cycle of the clock 30 controls multiplexing of the mobile electrode 5. FIG. 4 shows one multiplexing period. That period defines a time interval P.

At time $T_1$ of the multiplexing period, the switches 11 and 12 connect the electrodes 3 and 4 to the voltage generators 14 and 15. The switch 13 connects the mobile electrode 5 to the capacitor 21. This position of the switches 11, 12 and 13 is maintained until time $T_2$. The time interval between $T_1$ and $T_2$ constitutes step 1: detection of the position of the mobile electrode 5.

The switches 11, 12 and 13 respectively connect the fixed electrodes 3 and 4 and the mobile electrode 5 to ground at time $T_2$ and remain in this configuration until time $T_3$. The time interval between $T_2$ and $T_3$ defines step 2.

The switches 11 and 12 connect the electrodes 3 or 4 to the voltage generator 16 at time $T_3$ and remain in this configuration until time $T_4$. The time interval between $T_3$ and $T_4$ defines step 3: applying the feedback force which has a motor effect on the mobile electrode 5.

The switches 11 and 12 connect the fixed electrodes 3 and 4 to ground at time $T_4$ and remain in this configuration until time $T_1+P$. The time interval between $T_4$ and $T_1+P$ defines step 4.

The cycle of the clock 30 therefore defines four steps:

Step 1: The position of the mobile electrode 5 is measured by applying two voltages $+V_m$ and $-V_m$ symmetrical about ground between the mobile electrode 5 and the fixed electrodes 3 and 4, respectively. If the mobile electrode 5 is not centred, the capacitance $C_1$ of the capacitor 8 and the capacitance $C_2$ of the capacitor 9 are not equal, and this results in a transfer of charge $\Delta Q=V_m(C_1-C_2)$ into the capacitor 21. The voltage $V_s$ represents the position of the mobile electrode 5 at the end of step 1.

Step 2: The capacitors 8 and 9 are discharged.

Step 3: A feedback voltage $V_{cr}$ is applied to one of the capacitors 8 or 9, according to a decision taken by the control system 20, which decision is itself a function of the difference between the position of the mobile electrode 5 and its nominal position (that in which $C_1=C_2$). This voltage $V_{cr}$ develops an electrostatic force $F_e$ which tends to return the mobile electrode 5 to its nominal position.

Step 4: The capacitors 8 and 9 are discharged.

Discharging the capacitors 8 and 9 eliminates interference between the measurement of the position and the application of the feedback voltage.

The duration of each these steps can be controlled.

The feedback voltage $V_{cr}$ can be constant, i.e. applied to the electrodes 3 or 4 and 5 in the form of a square pulse, but it is more advantageous if the feedback voltage $V_{cr}$ is applied to the electrodes 3 or 4 and 5 in the form of a pulse with a steep rising edge and an exponentially decreasing falling edge.

This reduces the sensitivity to clock fronts, i.e. to clock phase noise, and therefore improves the signal/noise ratio of the sensor. The electrostatic force $F_e$ applied to the mobile electrode 5 is proportional to the integral of The square of the feedback voltage $V_{cr}$. Phase noise on the falling edge of the pulse thereof does not greatly change the value of this integral if the feedback voltage $V_{cr}$ falls progressively, possibly even to zero, at the end of the pulse. Thus a decrease of the exponential type or like that of a damped sine function is also suitable, for example.

In this case, the feedback voltage $V_{cr}$ is advantageously generated in the following manner: The capacitor $C_d$ 23 is charged to a reference voltage $V_{ref}$ by a generator 19 of the voltage $V_{ref}$ during steps 1, 2 and/or 4. During step 3, which is the step of application of the feedback voltage $V_{cr}$, the capacitor $C_d$ 23 is connected between the mobile electrode 5 and one or other of the fixed electrodes 3 and 4 and to the terminals of the discharge resistor $R_d$ 24. The decision to apply the feedback voltage $V_{cr}$ to one or other of the fixed electrodes 3 and 4 is taken according to the sign of the displacement of the mobile plate 6.

The principle of adjusting the resonant frequency of the accelerometer according to the invention is described below.

The apparent resonant frequency $f_{ra}$ is related to the mass of the mobile plate and to the apparent return stiffness:

$$f_{ra} = \frac{1}{2\pi}\sqrt{\frac{k_a}{m}} \text{ where } k_a \text{ (apparent stiffness)} = k_m$$

(spring stiffness–$k_e$ (electrostatic stiffness) and where m is the mass of the mobile plate.

The value of $k_a$ can therefore be adjusted by varying the electrostatic stiffness $k_e$.

The performance of the sensor is improved because it is related to the apparent frequency $f_{ra}$ and not to the mechanical resonant frequency $$f_{rm} = \frac{1}{2\pi}\sqrt{\frac{k_m}{m}}$$

and because $k_a$ can be reduced, i.e. it is possible to increase the dynamic range, which is proportional to $S=m/k_a$.

During the production of the accelerometer according to the invention, the mechanical resonant frequency is deliberately placed beyond the top frequency of the band of interest (high stiffness $k_m$). This limits sagging and reduces the distance between electrodes, and therefore enables the use of high electric fields (and therefore a high electrostatic stiffness $k_e$) to bring the apparent resonant frequency back into the band of interest.

The feasible multiplexing frequency range is from 100 to 500 times the highest wanted frequency, for example.

This facilitates obtaining a high loop gain in the band of interest without compromising the stability of the looped system.

In one particular but non-limiting method of adjusting the accelerometer according to the invention, the electrostatic stiffness $k_e$ is provided by adjusting the duration of step 1.

It is preferable to adjust the duration of step 1 because this affects only the parameter $k_e$.

In continuous systems the electrostatic stiffness, i.e. the derivative of the electrostatic force with respect to the distance between the electrodes, is proportional to the square of the voltage and inversely proportional to the cube of the distance between the electrodes. In sampled systems, because the sampling frequency is very much higher than the cut-off frequency, it is also proportional to the cyclic ratio of application of the voltage (Ta/Te where Ta is the period of application of the feedback voltage $V_{cr}$ and Te is the sampling period).

In other embodiments of the present invention the amplitudes of the voltages between the fixed electrodes 3 and 4 and the mobile electrode 5 could be varied by the electronic circuit 10. This can also adjust the electrostatic stiffness, even if in this case the performance of the accelerometer is less good than when the electrostatic stiffness is adjusted by varying the duration of step 1. Varying the amplitude of the voltage applied during step 1 modifies the sensitivity of detection of the position of the mobile electrode 5, which affects the stability of the feedback loop. Varying the amplitude of the voltage or the duration of step 3 also modifies the sensitivity of the accelerometer. The electrostatic stiffness could also be adjusted by simultaneously varying the amplitude of the voltages applied between the fixed electrodes 3 and 4 and the mobile electrode and the duration of the position measurement step and/or the step of application of the electrostatic force, during time-division multiplexing.

Adjusting the resonant frequency as described above:

compensates the spread of the mechanical stiffness of the springs 7, and thus simplifies production of the accelerometers, reduces the sagging of vertical accelerometers, without loss of performance, and optimizes performance as a function of the wanted band.

In geophysical seismic prospecting, for example, it is standard practice to vary the bandwidth of the signal acquisition system as a function of the areas explored or investigation depth targets: 100, 200 or 400 Hz. If the resonant frequency of a prior art accelerometer is optimized for a given bandwidth, for example 100 Hz, the performance is very degraded if it is used at 400 Hz. Adjusting the electrostatic stiffness to the new conditions of use, as with the accelerometer of the invention, re-establishes optimum performance.

As described above, the accelerometer according to the invention comprises a sensor 1 with one mobile electrode 5 and two fixed electrodes 3 and 4 but the sensor 1 can also comprise several mobile electrodes 5 and more than two fixed electrodes 3 or 4. Similarly, a plurality of sensors 1 can be associated with each other to constitute an accelerometer according to the invention in which the resonant frequency of each sensor 1 is determined by a mechanical stiffness and adjustment of the electrostatic stiffness as described above.

An accelerometer according to the invention can be used for seismic prospecting, detecting impacts for safety systems such as airbags, etc.

Many devices having varied applications can include an accelerometer according to the present invention as described hereinafter and as claimed hereinafter.

What is claimed is:

1. Slaved mobile plate accelerometer using variations of capacitance to detect the movement of a mass, comprising:

at least one pair of fixed electrodes rigidly attached to an armature, and at least one mobile electrode suspended by springs from the armature, between the two fixed electrodes of said pair of fixed electrodes, to form two capacitors, said mobile electrode being adapted to move between the fixed electrodes of each pair of fixed electrodes, due to the effect of the acceleration, so causing a variation of the capacitance of each capacitor, characterized in that said accelerometer includes an electronic circuit for adjusting the electrostatic stiffness of at least one combination of a fixed electrode and a mobile electrode and comprising a control system for detecting the variation of the capacitance of each capacitor by applying two voltages ($+V_m, -V_m$) symmetrical about ground, and reacting by applying a feedback voltage between each mobile electrode and the fixed electrode facing said mobile electrode, in that the springs have a stiffness chosen intentionally to place the mechanical resonant frequency beyond the lop frequency of the band of interest, and in that the circuit for adjusting the electrostatic stiffness is adapted to return the apparent resonant frequency into the band of interest.

2. Accelerometer according to claim 1, characterized in that said accelerometer comprises two fixed electrodes electrically insulated from each other.

3. Accelerometer according to claim 1, characterized in that said accelerometer comprises a single mobile electrode.

4. Accelerometer according to claim 1 characterized in that the electronic circuit enables time-division multiplexing of each mobile electrode.

5. Accelerometer according to claim 2, wherein the accelerometer comprises a single mobile electrode, the electronic circuit enables time-division multiplexing of each mobile electrode and wherein multiplexing cycle includes four steps, which are: a first step during which a voltage sample and its symmetrical counterpart relative to ground are respectfully applied between each fixed electrode and the mobile electrode, a second step during which the capacitors constituted by one of said two fixed electrodes and the mobile electrode and the capacitor constituted by the other fixed electrode and the mobile electrode are discharged, a third step during which a feedback voltage is applied to one or the other of the capacitors constituted by the mobile electrode and one of the fixed electrodes, as a function of a decision taken by the control system, and a fourth step during which the operation of the second step is repeated.

6. Accelerometer according to claim 1 whose electronic circuit varies the amplitudes of the voltages between each fixed electrode and each mobile electrode to adjust the electrostatic stiffness.

7. Accelerometer according to claim 1 whose electronic circuit adjusts the duration of the time-division multiplexing steps.

8. Accelerometer according to claim 7, characterized in that adjusting the duration of the time-division multiplexing step adjusts the electrostatic stiffness.

9. Accelerometer according to claim 6, characterized in that adjusting the electrostatic stiffness compensates the spread of the mechanical stiffness of the springs.

10. Accelerometer according to claim 6, characterized in that adjusting the electrostatic stiffness adjusts the sag when said accelerometer is in a vertical position, without loss of performance.

11. Accelerometer according to claims 6, characterized in that adjusting the electrostatic stiffness optimizes performance as a function of the wanted band.

12. Accelerometer according to claim 4, characterized in that the feedback voltage is applied between each mobile electrode and the fixed electrode in the form of a pulse with a falling edge falling progressively, possibly even to zero, at the end of the pulse.

13. Accelerometer according to claim 4, characterized in that said accelerometer includes a parallel RC circuit for generating a feedback voltage in the form of a pulse with a steep rising edge and an exponentially decreasing falling edge.

14. Application of an accelerometer according to claim 1, to seismic prospecting.

15. Accelerometer according to claim 8, characterized in that adjusting the electrostatic stiffness compensates the spread of the mechanical stiffness of the springs.

16. Accelerometer according to claim 8, characterized in that adjusting the electrostatic stiffness adjusts the sag when said accelerometer is in the vertical position, without loss of performance.

17. Accelerometer according to claim 8, characterized in that adjusting the electrostatic stiffness optimizes performance as a function of the wanted band.

* * * * *